US005649984A

United States Patent [19]

Sigalas et al.

[11] Patent Number: 5,649,984

[45] Date of Patent: Jul. 22, 1997

[54] ABRASIVE BODY

[76] Inventors: Iacovos Sigalas, 112 3rd Street Linden; Bronwyn Annette Roberts, 94 18th Street, Parkhurst, both of Johannesburg, South Africa; Ralph Riedel, Hessenring 2A, 64832 Badenhausen, Germany

[21] Appl. No.: 516,432

[22] Filed: Aug. 17, 1995

[30] Foreign Application Priority Data

Aug. 17, 1994 [ZA] South Africa ........................... 94/6208

[51] Int. Cl.[6] ....................................................... C09C 1/68

[52] U.S. Cl. ................................ 51/293; 51/307; 51/308; 51/309

[58] Field of Search ............................... 51/293, 307–309

[56] References Cited

U.S. PATENT DOCUMENTS

| | | | |
|---|---|---|---|
| 3,743,489 | 7/1973 | Wentorf, Jr. et al. | 51/307 |
| 3,745,623 | 7/1973 | Wentorf, Jr. et al. | 407/119 |
| 3,767,371 | 10/1973 | Wentorf, Jr. et al. | 51/307 |
| 4,157,897 | 6/1979 | Keat | 51/309 |
| 4,212,677 | 7/1980 | Khmelev et al. | 106/38.35 |
| 4,279,654 | 7/1981 | Yajima et al. | 51/309 |
| 4,334,928 | 6/1982 | Hara et al. | 75/238 |
| 4,767,728 | 8/1988 | Riccitiello et al. | 501/91 |
| 4,851,491 | 7/1989 | Riccitiello et al. | 501/91 |
| 5,178,644 | 1/1993 | Huzinec | 51/308 |
| 5,215,942 | 6/1993 | MacKenzie et al. | 501/12 |
| 5,453,105 | 9/1995 | Middlemiss et al. | 51/307 |

FOREIGN PATENT DOCUMENTS

| | | |
|---|---|---|
| 0 372 382 A3 | 6/1990 | European Pat. Off. . |
| 0 389 962 A3 | 10/1990 | European Pat. Off. . |
| 0 406 847 A1 | 1/1991 | European Pat. Off. . |
| 2 197 829 | 9/1973 | France . |
| WO92/10442 | 6/1992 | WIPO . |
| WO93/23794 | 11/1993 | WIPO . |
| WO94/25199 | 11/1994 | WIPO . |

OTHER PUBLICATIONS

Patent Abstracts of Japan, Publication No. JP63270743. Apr., 1987.

Encyclopedia of Chemical Technology, vol. 10, p. 265, "Deposition of Films at Atmospheric Pressure". 1980, (no month).

Encyclopedia of Chemical Technology, vol. 16, pp. 572–573, "Group IVA". 1981.

J.K. Wright et al., The Manufacture of Thin–Walled Ceramic Bodies from Phenylmethylsilylene–Dimethylsilylene Copolymers (Polysilastyrene), *Br. Ceram. Trans. J.*, 89, pp. 163–167 (1990) no month.

L.V. Interrante et al., Pyrolysis of Organometallic Precursors as a Route to Novel Ceramic Materials, *Mat. Res. Soc. Symp. Proc.*, 249, p. 31 (1992) no month.

R.T. Paine et al., Synthesis and Processing of BN Preceramic Polymers, *Polymers Preprints*, 34:1, p. 336 (1993) no month.

D. Seyferth et al., Near–Stoichiometric Silicon Carbide from an Economical Polysilane Precursor, *J. Am. Ceram. Soc.*, 75:5, p. 1300 (1992) no month.

E. Bouillon et al., Conversion Mechanisms of a Polycarbosilane precursor into an SiC–based ceramic material, *J. Mat. Sci.*, 26, p. 1333 (1990) no month.

G.D. Soraru et al., Structural evolutions from polycarbosilane to SiC ceramic, *J. Mat. Sci.*, 25, p. 3886 (1990) no month.

G.M. Brown et al., Ammonolysis Products of the Dialkylamides of Titanium, Zirconium, and Niobium as Precursors to Metal Nitrides, *Amer. Ceram. Soc.*, 71, pp. 78–82 (1988) No month.

R. West et al., Polysilastyrene: Phenylmethylsilane–Dimethylsilane Copolymers as Precursors to Silicon Carbide, *Ceramic Bulletin*, vol. 62, No. 8, pp. 899–903 (1983) No month.

Z.F. Zhang et al., Poly(methylsilane)–A High Ceramic Yield Precursor to Silicon Carbide, *J. Am. Ceram. Soc.*, 74(3), 670–673 (1991) no month.

C.L. Czekaj, et al., Preparation of Silicon Carbide/Aluminum Nitride Ceramics Using Organometallic Precursors, *J. Am. Ceram. Soc.*, 73(2), 352–357 (1990) no month.

Sumio Sakka et al., Organometallic–Derived Ceramics, *Ceramics International*, 17(4), 217–225 (1991). No month.

*Primary Examiner*—Deborah Jones

*Attorney, Agent, or Firm*—Scully, Scott, Murphy & Presser

[57] ABSTRACT

A method of manufacture of an abrasive body for use as a wear part, cutting tool insert or the like, includes the steps of providing a mixture comprising an organometallic polymer capable of being pyrolized to produce ceramic particles, and a mass of abrasive particles such as diamond or cubic boron nitride, applying heat to the mixture to cause the polymer to polymerize, and sintering of the pyrolized mixture to a coherent abrasive body.

16 Claims, No Drawings

ABRASIVE BODY

BACKGROUND OF THE INVENTION

This invention relates to abrasive bodies for use as wear parts, cutting tool inserts and the like.

Abrasive compacts are used extensively in curing, milling, grinding, drilling and other abrasive operations. They generally contain ultrahard abrasive particles dispersed in a second phase matrix. The matrix may be metallic or ceramic. The ultrahard abrasive particles may be diamond or cubic boron nitride (CBN). These particles are known to bond to each other during the high pressure and high temperature compact manufacturing process generally used, forming a polycrystalline mass. The bodies so produced are thus also known as PCD or PCBN.

Examples of diamond and cubic boron nitride abrasive compacts are described in U.S. Pat. Nos. 3,745,623; 3,767,371; 3,743,489; and 4,334,928.

For example, U.S. Pat. No. 4,334,928 teaches a sintered compact for use in a tool consisting essentially of 80 to 20 volume percent of high pressure form boron nitride; and the balance being a matrix of at least one binder compound material selected from the group consisting of a carbide, a nitride, a carbonitride, a boride and a silicide of a IVa or a Va transition metal of the periodic table, mixtures thereof and their solid solution compounds; the matrix forming a continuous bonding structure in a sintered body and where the high pressure boron nitride is interspersed within a continuous matrix.

Refractory ceramics have been synthesized at relatively low temperatures and ambient pressures by pyrolyzing organic precursors. Sintered ceramic bodies of various shapes may be produced by utilizing this route. The following papers describe such processes:

1. Wright, J. K. and Evans, J. R. G., Br.Ceram. Trans. J., 89, 163–167, 1990.

2. Interrante L. V. et al, Mat. Res. Soc. Symp. Proc. Vol. 249, 31, 1992.

3. Paine R. T. et al, Polymer Preprints, Vol. 34 No. 1, 336, 1993.

4. Seyferth D. et al, J. Am. Ceram. Soc., 75(5), 1300, 1992.

5. Bouillon E. et al, J. of Mat. Sci., 26 1333, 1991.

6. Soraru G. D., et al, J. of Mat. Sci., 25, 3886, 1990.

7. Gilbert M. Brown and Leon Maya T., Amer. Ceram. Soc. 71, 78–82 (1988).

Diamond grinding wheels comprising a mass of diamond particles dispersed in a ceramic matrix are also known in the art.

SUMMARY OF THE INVENTION

According to the present invention, a method of manufacturing an abrasive body includes the steps of:

(i) providing a mixture comprising an organometallic polymer capable of being pyrolized to produce ceramic particles and a mass of abrasive particles;

(ii) applying heat to the mixture to cause the polymer to pyrolise; and (iii) sintering of the pyrolized mixture into a coherent abrasive body.

DESCRIPTION OF EMBODIMENTS

The sintered abrasive body manufactured by the method of the invention comprises abrasive particles dispersed in a second phase material. The second phase material is a ceramic, preferably a refractory ceramic. Examples of suitable ceramics are silicon carbide, silicon nitride, silicon carbonitride, silicon dioxide, boron nitride, boron carbide, aluminum nitride, tungsten carbide, titanium carbide, titanium nitride and generally various carbides, nitrides, borides of transition metals.

Adjacent abrasive particles are generally not bonded to each other, but are strongly bonded to the surrounding second phase material, which forms a continuous phase. The abrasive particles are preferably selected from the group including diamond and cubic boron nitride or mixtures thereof.

The sintered abrasive bodies produced are tough and wear-resistant and are suitable for use, for example, as wear-resistant surfaces such as bearing surfaces or as tool inserts. Where the abrasive particle is cubic boron nitride (CBN), the body can be used for cutting or machining ferrous alloys or ferrous nickel base alloys or nickel base superalloys. Where the abrasive particle is diamond, the body may be used in various cutting, machining and drilling applications in engineering and mining. For example, it may be used as the abrasion resistant, active cutting element in woodworking applications, or in the machining of aluminum silicon alloys, or in the machining of fiber reinforced polymer or metal matrix composites. Also, it may be used as the cutting or gauge keeping element in coring or oil drilling bits.

In step (i) of the method of the invention, there is provided a mixture comprising an organometallic polymer capable of being pyrolized to produce ceramic particles and a mass of abrasive particles. This may be achieved in various ways, examples of which are set out below:

1 The mixture may be prepared by dissolving an organometallic precursor of the polymer in a suitable solvent in a container. The abrasive particles may then be added to the solution. The mixture may then be heated so that the solvent is evaporated and the organometallic precursor is subsequently polymerized. The polymerization generally takes place at a temperature in the range of from 100° C. to 500° C. inclusive, depending on the precursor involved. The resultant mixture, which is now in a coherent, solid form, shaped according to the shape of the container, comprises the abrasive particles dispersed in the polymer. Ball milling of the mixture is then optional.

2 The mixture in the form of a fine powder may be prepared by milling an organometallic precursor of the polymer with the mass of abrasive particles, polymerizing the precursor, and then optionally milling the mixture.

3 The mixture in the form of a fine powder may be prepared by simultaneously mixing and polymerizing an organometallic precursor of the polymer and the mass of abrasive particles, and then optionally milling the mixture.

4 The mixture in the form of a fine powder may be prepared by milling the polymer with the mass of abrasive particles.

The concentration of the abrasive particles in the mixture should be such that their concentration in the final sintered abrasive body is in the range from 30% to 90% inclusive by volume and preferably in the range of from 50% to 80% inclusive by volume.

The method of the invention may include a step, between step (i) and step (ii), of pressing the mixture of step (i) to form a green body for step (ii).

In step (ii) of the method of the invention heat is applied to the mixture of step (i) or to the green body of the intermediate step, to cause the polymer to pyrolize.

In the pyrolization step, the mixture may be heated to a temperature in the range of from 300° C. to 1000° C. inclusive to cause decomposition of the polymer and to drive off gaseous by-products.

Step (ii) may be carried out in three stages:

(ii)(a) rapidly heating the mixture for example at a heating rate of up to 10° C. per minute until the temperature reaches about 300° C.;

(ii)(b) then slowly heating the mixture for example at a heating rate of from 10° C. to 20° C. inclusive per hour, when the temperature is between about 300° C. and about 800° C.; and (ii)(c) then rapidly heating the mixture for example at a heating rate of up to 10° C. per minute until the temperature reaches about 1000° C.

The mixture may be held at the final temperature for a period of time to ensure pyrolysis of the polymer. For example, the mixture may be held at the final temperature for a period of four hours.

The reason for the variation in heating rates is that slow heating at intermediate temperatures is necessary since during the thermolysis of the green bodies, $H_2$, $CH_4$ and other volatiles evaporate mainly between 300° C. and 800° C. through the transient open porosity.

Step (ii) is preferably carried out in an inert atmosphere of nitrogen or a mixture thereof.

The result of step (ii) is ceramic particles in which the crystallite size may be of the order of 10–500 nanometers and with which the abrasive particles are intimately mixed. Such ceramic particles are usually characterized by a high surface area with a concomitant large activity.

In step (iii) of the method of the invention the pyrolized mixture is sintered into a coherent abrasive body.

The sintering of the mixture may cause surface impurities on the abrasive particles to be drawn off, increasing their propensity to bond with reaction sites in or on the ceramic particles.

Sintering of the ceramic/abrasive particle mixture generally takes place at a temperature between 1000° C. and 1400° C. inclusive. A temperature of between 1000° C. and 1100° C. inclusive is employed where the abrasive particles in the mixture are diamond. A temperature of between 1000° C. and 1400° C. inclusive is employed where the abrasive particles in the mixture are CBN.

The temperature used will determine the composition of the final sintered abrasive body. At the lower end of the sintering temperature scale an amorphous matrix is formed, while on the upper end of the scale a crystallized matrix is formed.

To increase the density of the abrasive body, sintering may be carried out under pressure. The pressure will generally not exceed 20 kBar. The preferred pressure range is from 10 Bar to 10 kBar. The fact that relatively low pressure or even pressureless sintering may be used, provides an advantage over prior art processes. Where pressure is applied, after its application the content of the abrasive particles in the pressure sintered body may be as high as 90% by volume.

A preferred organometallic polymer for use in the method of the invention is a polymerized polyorganosilazane such as NCP200 (a product of Hoechst Aktiengesellschaft) which may be transformed to an amorphous silicon carbonitride ceramic matrix.

The invention will be illustrated by the following examples:

EXAMPLE 1

A mass of finely ground tetrakis (dimethylamido) titanium was mixed with a mass of CBN particles with a particle size ranging between 0.5 and 2 micrometers. The mixture was then placed inside a reaction vessel in a helium atmosphere and was in turn connected to a vacuum line and filled with liquid ammonia by distillation. The reaction vessel was sealed under vacuum and the mixture warmed to room temperature. The brick-red titanium ammonolysis product precipitated out virtually instantaneously: nevertheless the reaction vessel was allowed to stand for four or more days with occasional shaking. The precipitate was allowed to settle and the supernatant thereafter decanted off. Ammonia was distilled back onto the solid to wash it and the decantation-distillation-wash process was repeated several times. The ammonia and the remaining dialkylamine were removed by distillation and the solid titanium compound containing finely dispersed CBN was pumped dry overnight. The solid ammonolysis product was found to have the empirical formula $Ti_3(N(CH_3)_2)(NH_2)_2(N)_3$. The compound was polymeric and bridged with nitrogen containing functional groups (nitrido, imido, amido).

The mixture was then pyrolized in a vacuum. Since most gaseous products (mainly $NH(CH_3)_2$ and $NH_3$) are emitted below 400° C., the mixture was heated to 800° C. The titanium polymeric product decomposed to TiN giving rise to an intimate TiN/CBN mixture. This thermal decomposition is a stoichiometric and is described by the formula:

$$Ti_3(N(CH_3)_2)(NH_2)_2(N)_3 \Delta TiN + NH\ (CH_3) + NH_3$$

Residual carbon remained in the TiN product as either TiC or amorphous carbon.

The resulting mixture was placed in a pressure vessel and heated to 1100° C. and 10 kBar for 15 minutes. On removal from the press, a coherent body having a porosity of less than 5% was found to have formed. The composition of the body was, by volume, 58% CBN, 35% TiN and 7% TiC.

EXAMPLE 2

A mixture of vinylsilane dissolved in toluene, and diamond powder (particles size range 0.5–2 microns on average) was prepared by a method similar to Example 1. After evaporating off the solvent, the mixture was heated progressively in a non-confined inert atmosphere to polymerize the vinylsilane and then pyrolize the polyvinylsilane at 800° C. Further heating to 1100° C. at 10 kBar pressure caused the mixture to sinter into an abrasive body having a free silicon content below 1% by mass. The body was laser cut into a triangle of dimensions 5 mm sides and brazed to a cemented tungsten carbide post by means of a braze alloy conventionally used in manufacturing a matrix drill bit. On cooling, the abrasive body did not delaminate from the carbide post.

EXAMPLE 3

Diethylaluminum amide, $Et_2AlNH_2$, was produced by reacting triethylaluminum with ammonia in a hydrocarbon solvent according to the reaction.

$$AlEt_3 + NH_3 \rightarrow Et_2AlNH_2 + C_2H_6$$

The ethane was eliminated, leaving the highly volatile, trimeric $Et_2AlNH_2$ intermediate. A solution of this intermediate was then mixed with a quantity of fine 0.5–2 micrometer particle size cubic boron nitride powder. The powder was homogenized by high slow mixing, followed by ultrasonic agitation. The mixture was placed in a reaction vessel inside a glovebox containing an inert atmosphere and connected to a vacuum line. The vessel was heated to 150° C., whereupon the mixture solidified and the aluminum intermediate decomposed to a product nominally described as EtAlNH. This product is of variable composition (depending on its thermal history), but is classified as an insoluble polymer with a wide distribution of molecular masses.

On further heating up to 400° C., the aluminium product converted to AlN through the thermal decomposition:

$$EtAlNH\Delta AlN+C_2H_6$$

The resulting AlN/CBN mixture was placed in a press and heated to 1000° C. under 10 kBar of pressure in order to remove porosity. The resultant body contained 60% by volume mainly discrete CBN particles in an aluminum nitride matrix.

EXAMPLE 4

The same procedure as in Example 3 was followed, except that after the CBN powder was admixed, a 10% volume charge of SiC whiskers was added. The resulting product had an improved toughness when compared to the unreinforced product of Example 3.

EXAMPLE 5

In this example polyorganosilazanes are transformed into amorphous silicon carbonitride ceramic matrixes. This ceramic matrix is generated by the polymer to ceramic conversion process denoted as hybrid processing.

In the first stage three different routes were investigated for providing a mixture comprising polysilazane and diamond or CBN abrasive particles:

(a) Ball milling of polysilazane NCP 200 doped with CBN or diamond. After polymerization (also called cross-linking) additional ball milling was necessary to produce a fine composite powder.

(b) Simultaneous mixing and polymerization of polysilazane NCP 200 and a mass of abrasive particles. Since NCP 200 becomes liquid and foams during polymerization, the abrasive particles are homogeneously distributed within the polymer after polymerization. Powders are produced by subsequent ball milling.

(c) Ball milling of polymerized NCP 200/abrasive particle mixtures.

Seeding particles such as $Si_3N_4$ or SiC may be added during the mixing stage.

The resultant powders were sieved through a 32 μm screen and cold isostatically pressed at 630 MPa to obtain cylindrical green bodies.

Subsequently, the green bodies were subjected to thermal treatment under Ar. The heating schedule of the pyrolysis step was optimized with respect to the total processing time by using a high heating rate of 10° C. per minute up to 300° C., a decelerated heating rate between 300° C. and 800° C. of from 10° C. to 20° C. per hour, and an accelerated heating rate up to 1000° C. of 10° C. per minute. The isothermal hold at the final temperature was four hours. The slow heating at intermediate temperatures was necessary since during the thermolysis of the green bodies, $H_2$ and $CH_4$ evaporate mainly between 300° C. and 800° C. through the transient open porosity.

Thereafter the bodies were subjected to additional heat treatments between 1100° C. and 1400° C. to crystallize and sinter the ceramic matrix. Again, a temperature of between 1000° C. and 1100° C. was employed where the abrasive particles in the mixture were diamond, and a temperature of between 1000° C. and 1400° C. was employed where the abrasive particles were CBN.

Since pure polysilazane derived silicon carbonitride crystallizes at temperatures greater than 1400° C., the decrease of the onset of crystallization in the presence of seeding particles such as $Si_3N_4$ or SiC was studied. Thus, two different ceramic composites were formed: diamond or CBN embedded in an amorphous Si—C—N matrix or diamond or CBN embedded in a polycrystalline $Si_3N_4$/SiC matrix.

We claim:

1. A method of manufacture of an abrasive body comprising the steps of:

(i) providing a mixture comprising an organometallic polymer and a mass of abrasive particles, wherein said organometallic polymer is a polymer which contains an organometallic precursor and forms ceramic particles when pyrolyzed;

(ii) applying heat to the mixture to cause the polymer to pyrolyze to ceramic particles to produce a pyrolized mixture of ceramic particles and abrasive particles; and (iii) sintering the pyrolized mixture into a coherent abrasive body.

2. A method according to claim 1 wherein in step (i) the mixture is provided by dissolving an organometallic precursor of the polymer in a suitable solvent, adding the mass of abrasive particles to the solution, and polymerized the organometallic precursor.

3. A method according to claim 2 wherein in step (i) the polymerization takes place at a temperature in the range of from 100° C. to 500° C. inclusive.

4. A method according to claim 1 wherein in step (i) the mixture is provided by milling an organometallic precursor of the polymer with the mass of abrasive particles, polymerizing the precursor, and then optionally milling the mixture.

5. A method according to claim 1 wherein in step (i) the mixture is provided by simultaneously mixing and polymerizing an organometallic precursor of the polymer and the mass of abrasive particles, and then optionally milling the mixture.

6. A method according to claim 1 wherein in step (i) the mixture is provided by milling the polymer with the mass of abrasive particles.

7. A method according to claim 1 wherein in step (i) the abrasive particles are provided in the mixture in an amount such that their concentration in the final coherent abrasive body is in the range of from 30% to 90% inclusive by volume.

8. A method according to claim 7 wherein in step (i) the abrasive particles are provided in the mixture in an amount such that their concentration in the final coherent abrasive body is in the range of from 50% to 80% inclusive by volume.

9. A method according to claim 1 wherein the method includes a step between step (i) and step (ii) of pressing the mixture of step (i) to form a green body for step (ii).

10. A method according to claim 1 wherein in step (ii) the mixture is heated to a temperature in the range of from 300° C. to 1000° C. inclusive to cause the polymer to pyrolyze.

11. A method according to claim 10 wherein in step (ii) the heating is carried out in three stages:

(ii)(a) rapidly heating the mixture until the temperature reaches about 300° C.;

(ii)(b) then slowly heating the mixture when the temperature is between about 300° C. and about 800° C.; and (ii)(c) then rapidly heating the mixture until the temperature reaches about 1000° C.

12. A method according to claim 1 wherein in step (iii) the pyrolized mixture is sintered at a temperature of from 1000° C. to 1400° C. inclusive.

13. A method according to claim 1 wherein in step (iii) the sintering is carried out under pressure.

14. A method according to claim 1 wherein the abrasive particles are selected from the group consisting of diamond and cubic boron nitride and mixtures thereof.

15. A method according to claim 1 wherein the ceramic particles are selected from the group consisting of silicon carbide particles, silicon nitride particles, silicon carbonitride particles, silicon dioxide particles, boron nitride particles, boron carbide particles, aluminum nitride particles, tungsten carbide particles, titanium carbide particles, titanium nitride particles, and particles of carbides, nitrides and borides of transition metals.

16. A method according to claim 1 wherein the organometallic polymer is a polymerized polyorganosilazane.

* * * * *

UNITED STATES PATENT AND TRADEMARK OFFICE

CERTIFICATE OF CORRECTION

PATENT NO. : 5,649,984

DATED : July 22, 1997

INVENTOR(S) : Iacovos Sigalas, et al.

It is certified that error appears in the above-identified patent and that said Letters Patent is hereby corrected as shown below:

Column 1, line 7: "curing" should read --cutting--

Column 1, line 61: "pyrolise" should read --pyrolize--

Column 4, line 32: "$\Delta$" should read --$\underline{\Delta}$--

Column 5, line 15: "$\Delta$" should read --$\underline{\Delta}$--

Column 6, line 30, Claim 2: "polymerized" should read --polymerizing--

Signed and Sealed this

Twenty-second Day of September, 1998

*Attest:*

BRUCE LEHMAN

*Attesting Officer* *Commissioner of Patents and Trademarks*